US012211657B2

(12) United States Patent
Tsai et al.

(10) Patent No.: US 12,211,657 B2
(45) Date of Patent: Jan. 28, 2025

(54) KEYCAP

(71) Applicant: Primax Electronics Ltd., Taipei (TW)

(72) Inventors: Lei-Lung Tsai, Taipei (TW); Sheng-Fan Chang, Taipei (TW); Che-An Li, Taipei (TW); Chang-Huan Shen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 165 days.

(21) Appl. No.: 18/111,480

(22) Filed: Feb. 17, 2023

(65) Prior Publication Data

US 2024/0242903 A1 Jul. 18, 2024

(30) Foreign Application Priority Data

Jan. 16, 2023 (TW) ................................ 112101887

(51) Int. Cl.
*H01H 13/14* (2006.01)
*H01H 13/20* (2006.01)

(52) U.S. Cl.
CPC ............ *H01H 13/14* (2013.01); *H01H 13/20* (2013.01)

(58) Field of Classification Search
CPC ......... H01H 2221/00; H01H 2221/032; H01H 2223/042; H01H 2223/054; H01H 2233/00; H01H 2233/01; H01H 2233/014; H01H 2233/024; H01H 2233/026; H01H 2233/03; H01H 2233/002; H01H 2233/006; H01H 2233/034; H01H 2219/036; H01H 2219/038; H01H 2219/039; H01H 2219/04; H01H 2219/042; H01H 2219/044; H01H 2219/046; H01H 2219/048; H01H 2219/05; H01H 2219/054; H01H 2219/06; H01H 2219/062; H01H 2219/0622; H01H 2219/064; H01H 2013/00; H01H 2013/02; H01H 2013/04; H01H 2013/06; H01H 2013/50; H01H 2013/52; H01H 2215/044; H01H 13/00; H01H 13/12; H01H 13/14; H01H 13/20; H01H 9/02; H01H 13/50; H01H 13/52; H01H 13/70; H01H 13/702; H01H 13/705; H01H 13/7057; H01H 2003/12
USPC .......................................................... 200/341
See application file for complete search history.

(56) References Cited

U.S. PATENT DOCUMENTS

| | | | | |
|---|---|---|---|---|
| 10,262,817 | B2 * | 4/2019 | Wareham | H01H 3/00 |
| 2006/0266629 | A1 * | 11/2006 | Yu | H01H 13/705 200/5 A |
| 2010/0252407 | A1 * | 10/2010 | Merminod | H01H 11/00 200/312 |

* cited by examiner

*Primary Examiner* — Anthony R Jimenez
(74) *Attorney, Agent, or Firm* — KIRTON McCONKIE; Evan R. Witt

(57) ABSTRACT

The present invention provides a keycap, which includes a lower plate and an upper cover. The lower plate has two openings respectively through two opposite sides of the lower plate to respectively define two elastic arms. The upper cover is configured to be detachably assembled on the lower plate, in which the upper cover has two abutting portions and a protrusion, and the two abutting portions are respectively disposed on two opposite inner sides of the upper cover and respectively correspond to the two elastic arms, and each of the two abutting portions is configured to abut against a portion of the corresponding elastic arm, and the protrusion is disposed on an inner top surface of the upper cover and corresponds to one of the two openings.

10 Claims, 5 Drawing Sheets

KEYCAP

FIELD OF THE INVENTION

The present disclosure relates to a keycap, in particular to a keycap including a lower plate and an upper cover configured to be detachably assembled on the lower plate.

BACKGROUND OF THE INVENTION

Keycaps of key structures of an existing keyboard device cannot be replaced. If the user wants to replace the keycaps with other keycaps (e.g., keycaps with different appearances), the entire keyboard device must be replaced, which is very inconvenient.

SUMMARY OF THE INVENTION

The present disclosure provides a keycap, which includes a lower plate and an upper cover. The lower plate has two openings respectively through two opposite sides of the lower plate to respectively define two elastic arms. The upper cover is configured to be detachably assembled on the lower plate, in which the upper cover has two abutting portions and a protrusion, and the two abutting portions are respectively disposed on two opposite inner sides of the upper cover and respectively correspond to the two elastic arms, and each of the two abutting portions is configured to abut against a portion of the corresponding elastic arm, and the protrusion is disposed on an inner top surface of the upper cover and corresponds to one of the two openings.

In some embodiments of the present disclosure, the lower plate has four connecting portions disposed on a lower surface of the lower plate, and the four connecting portions are configured to respectively connect four portions of a scissor-type connecting element.

In some embodiments of the present disclosure, after the upper cover is assembled on the lower plate, an overlapping width between the abutting portion and the corresponding elastic arm is in a range of from about 0.15 mm to about 0.20 mm.

In some embodiments of the present disclosure, the elastic arm has an outer upper sloping surface, and the abutting portion has a lower sloping surface, and the outer upper sloping surface and the lower sloping surface are complementary to each other.

In some embodiments of the present disclosure, a length of the elastic arm is greater than a length of the abutting portion.

In some embodiments of the present disclosure, a length of the opening is greater than a length of the protrusion.

In some embodiments of the present disclosure, a width of the opening is greater than a width of the protrusion.

In some embodiments of the present disclosure, the elastic arm has an inner upper sloping surface, and the protrusion has a sloping surface, and after the upper cover is assembled on the lower plate, the inner upper sloping surface is adjacent to the sloping surface.

In some embodiments of the present disclosure, the upper cover further has at least two positioning portions respectively disposed on two inner sides of the upper cover other than the two opposite inner sides, and the two positioning portions are configured to respectively contact two outer edges of two sides of the lower plate other than the two opposite sides.

In some embodiments of the present disclosure, four corners of the lower plate are inwardly recessed.

In some embodiments of the present disclosure, an outer edge of each of the elastic arms is inwardly recessed.

BRIEF DESCRIPTION OF THE DRAWINGS

Aspects of the present disclosure are best understood from the following embodiments, read in conjunction with the accompanying drawings. It should be understood, however, that in accordance with common practice in the industry, various features have not necessarily been drawn to scale. Indeed, shapes of the various features may be suitably adjusted for clarity, and dimensions of the various features may be arbitrarily increased or decreased.

DETAIL DESCRIPTION OF THE PREFERRED EMBODIMENT

Figure 1:
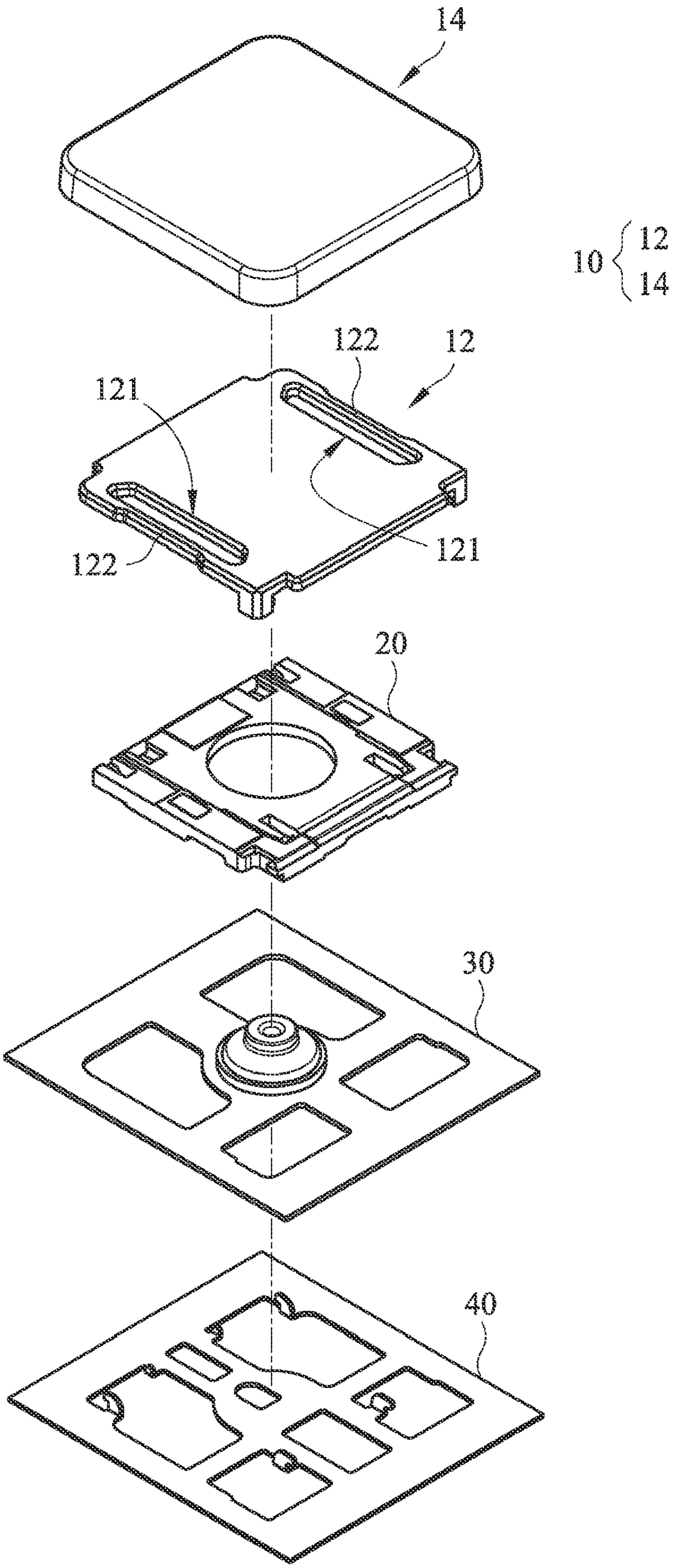
FIG. 1 is a top perspective exploded schematic diagram of a key structure according to an embodiment of the present invention.

The advantages and features of the present disclosure and the method for achieving the same will be described in more detail with reference to exemplary embodiments and the accompanying drawings to make it easier to understand. However, the present disclosure can be implemented in different forms and should not be construed as being limited to the embodiments set forth herein. On the contrary, for those skilled in the art, the provided embodiments will make this disclosure more thorough, comprehensive and complete to convey the scope of the present disclosure.

The spatially relative terms in the text, such as "beneath" and "over", are used to facilitate the description of the relative relationship between one element or feature and another element or feature in the drawings. The true meaning of the spatially relative terms includes other orientations. For example, when the drawing is flipped up and down by 180 degrees, the relationship between the one element and the other element may change from "beneath" to "over." In addition, the spatially relative descriptions used herein should be interpreted the same.

As described in the related art, the keycaps of the key structures of the existing keyboard device cannot be replaced. If the user wants to replace the keycaps with other keycaps (e.g., keycaps with different appearances), the entire keyboard device must be replaced, which is very inconvenient. Accordingly, the present invention provides a keycap, which includes a lower plate and an upper cover, and the user can easily disassemble the upper cover from the lower plate and assemble the upper cover or another upper cover on the lower plate, that is, the user can replace the upper cover of the keycap at will, which is very convenient. Various embodiments of the keycap of the present invention will be described in detail below.

FIG. 1 is a top perspective exploded schematic diagram of a key structure according to an embodiment of the present invention. In some embodiments, as shown in FIG. 1, the key structure includes a keycap 10, a scissor-type connecting element 20, a membrane circuit board 30 and a base plate 40, and the membrane circuit board 30 and the base plate 40 are located beneath the scissor-type connecting element 20, and the scissor-type connecting element 20 is located beneath the keycap 10. In some embodiments, the key structure further includes an elastic element (not marked) interposed between the keycap 10 and the membrane circuit board 30.

Figure 2:
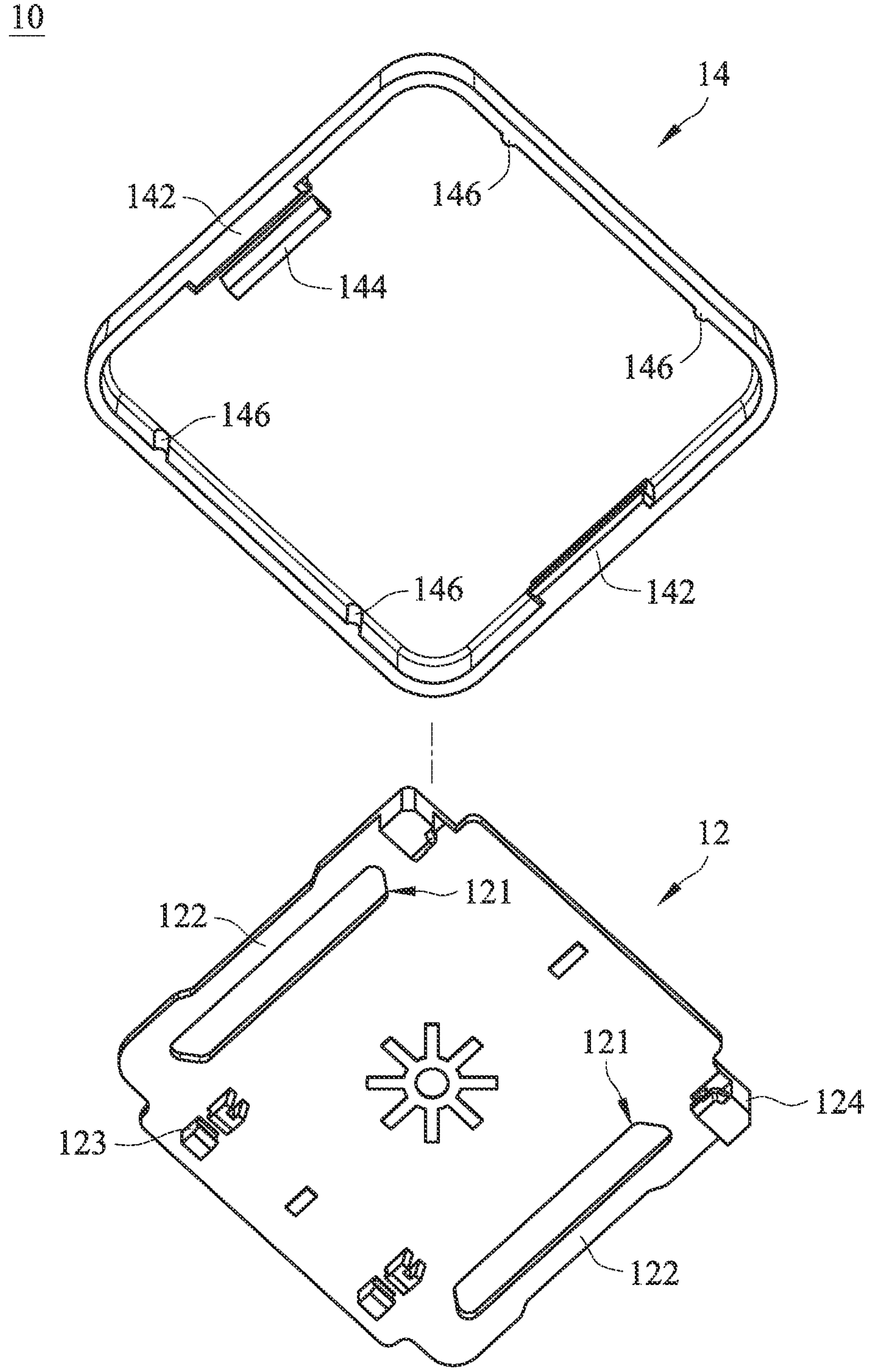
FIG. 2 is a bottom perspective exploded schematic diagram of the keycap of FIG. 1.

FIG. 2 is a bottom perspective exploded schematic diagram of the keycap of FIG. 1. As shown in FIGS. 1 and 2, the keycap 10 includes a lower plate 12 and an upper cover 14. The lower plate 12 has two openings 121 respectively through two opposite sides of the lower plate 12 to define two elastic arms 122, respectively. In some embodiments, a length of the elastic arm 122 is equal a length of one side of the opening 121 for defining the elastic arm 122. In some embodiments, four corners of the lower plate 12 are inwardly recessed to avoid hindering the removal of the upper cover 14. In some embodiments, an outer edge of each of the elastic arms 122 is inwardly recessed, so that a portion of the elastic arm 122 has a narrower width. However, the present invention is not limited to the foregoing embodiments, and in other embodiments (not shown), an outer edge of each of elastic arms can protrude outward. In some embodiments, the lower plate 12 is made of plastic, such as acrylonitrile butadiene styrene (ABS) or polycarbonate (PC).

As shown in FIG. 2, the upper cover 14 has two abutting portions 142 and a protrusion 144. The two abutting portions 142 are respectively disposed on two opposite inner sides of the upper cover 14 and correspond to the two elastic arms 122, respectively. In some embodiments, each of the abutting portions 142 protrudes laterally from the inner side of the upper cover 14. The protrusion 144 is disposed on an inner top surface of the upper cover 14 and corresponds to one of the two openings 121.

Figure 3:
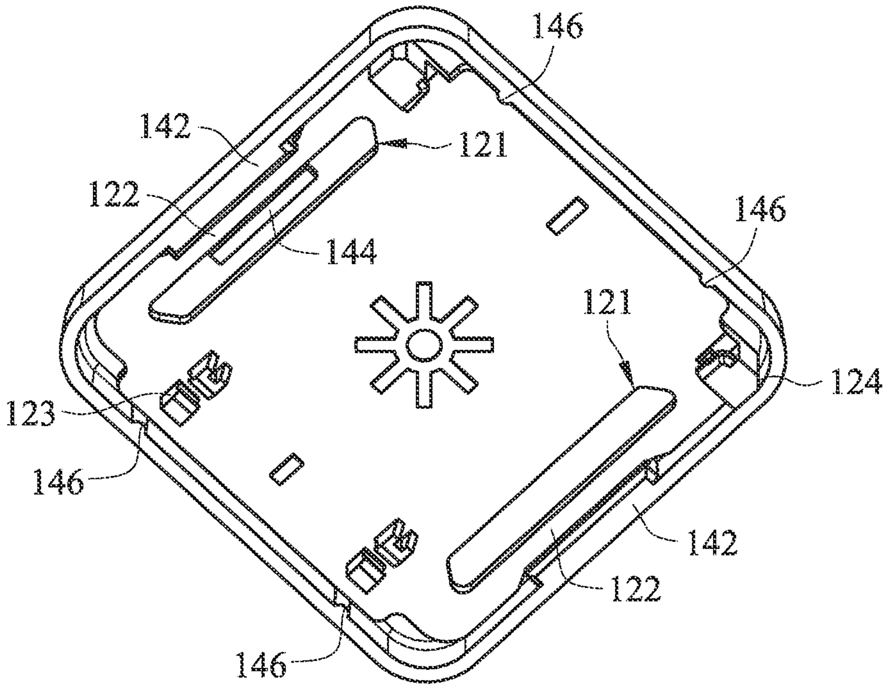
FIG. 3 is a bottom perspective schematic diagram after the upper cover is assembled on the lower plate in FIG. 2.

FIG. 3 is a bottom perspective schematic diagram after the upper cover is assembled on the lower plate in FIG. 2. As shown in FIGS. 2 and 3, the upper cover 14 is configured to be detachably assembled on the lower plate 12. Each of the abutting portions 142 is configured to abut against a portion of the corresponding elastic arm 122 (e.g., to abut against an outer surface and a lower surface thereof) to prevent the lower plate 12 in the upper cover 14 from sliding.

In some embodiments, as shown in FIGS. 2 and 3, a length of the elastic arm 122 is greater than a length of the abutting portion 142. In some embodiments, a length of the opening 121 is greater than a length of the protrusion 144. In some embodiments, a width of the opening 121 is greater than a width of the protrusion 144.

In some embodiments, as shown in FIGS. 2 and 3, the upper cover 14 further has at least two positioning portions 146 respectively disposed on two inner sides of the upper cover 14 other than the two opposite inner sides. The two positioning portions 146 are configured to respectively contact two outer edges of two sides of the lower plate 12 other than the two opposite sides to prevent the lower plate 12 in the upper cover 14 from sliding. In some embodiments, each of the positioning portions 146 protrudes laterally from the inner side of the upper cover 14.

However, it should be noted that the present invention is not limited to the above-mentioned embodiments, the quantity, shape, size and/or setting position of the opening 121 and/or the elastic arm 122 of the lower plate 12 and/or the abutting portion 142, the protrusion 144 and/or the positioning portion 146 of the upper cover can be properly adjusted according to some parameter conditions, so that the upper cover 14 can be easily disassembled and assembled, and the entire structure can be stabilized after the upper cover 14 is assembled on the lower plate 12.

In some embodiments, as shown in FIGS. 2 and 3, the lower plate 12 has four connecting portions (e.g., two hook portions 123 and two slide grooves 124) disposed on a lower surface of the lower plate 12, which are configured to respectively connect four portions of the scissor-type connecting element 20 shown in FIG. 1. In some embodiments, as shown in FIG. 1, the base plate 40 has four hook parts (not marked), which are configured to respectively connect to other four portions of the scissor-type connecting element 20. As such, it can be ensured that the scissor-type connection element 20 does not detach from the lower plate 12 of the keycap 10 and the base plate 40 when the key structure is in operation. However, the present invention is not limited to the above-mentioned embodiments, and the lower plate 12 may have connecting portions with other structures disposed on the lower surface of the lower plate 12 to cooperate with another component located beneath the lower plate 12.

Figure 4:
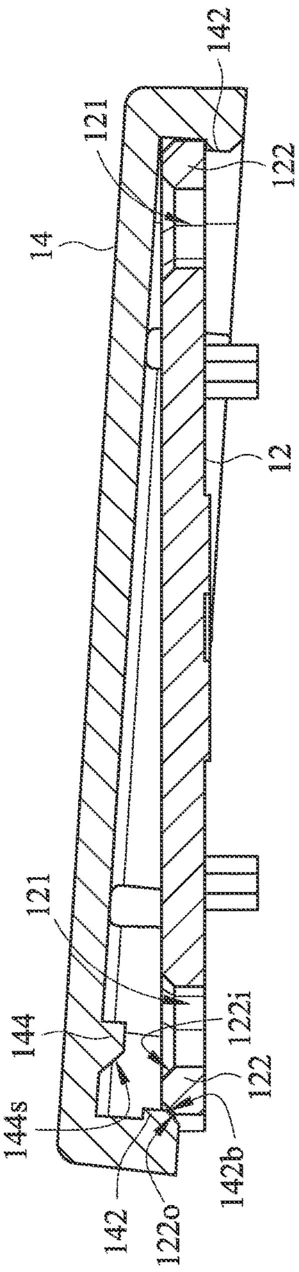
FIG. 4 and FIG. 5 are schematic cross-sectional views when the upper cover is assembled on the lower plate in FIG. 2.
Figure 5:
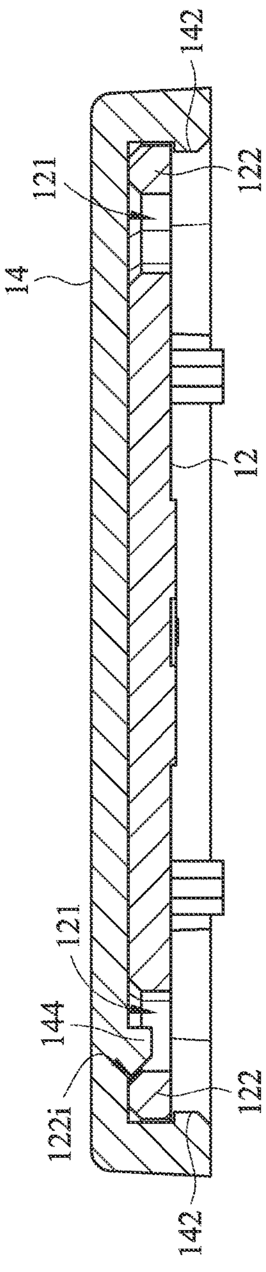

FIG. 4 and FIG. 5 are schematic cross-sectional views when the upper cover is assembled on the lower plate in FIG. 2. The assembly method of the upper cover 14 is described below. First, please refer to FIG. 4, the user places the upper cover 14 on the lower plate 12, and makes one of the abutting portions 142 of the upper cover 14 abut against a portion (e.g., its outer surface and lower surface) of the corresponding elastic arm 122; next, please refer to FIG. 5, the user can press the left side of the upper cover 14, so that another abutting portion 142 abuts against a portion (e.g., its outer surface and lower surface) of the corresponding elastic arm 122, so that the lower plate 12 cannot slide in the upper cover 14.

In some embodiments, as shown in FIG. 5, after the upper cover 14 is assembled on the lower plate 12, an overlapping width between the abutting portion 142 and the corresponding elastic arm 122 is in a range of from about 0.15 mm to about 0.20 mm. In some embodiments, as shown in FIG. 4, the elastic arm 122 has an outer upper sloping surface 1220, and the abutting portion 142 has a lower sloping surface **142*b*, and the outer upper sloping surface 1220 and the lower sloping surface 142*b* are complementary to each other, so the resistance generated after those are in contact with each other is very small, which facilitates the subsequent downward movement of the abutting portion 142. In some embodiments, as shown in FIG. 4, the elastic arm 122 has an inner upper sloping surface 122*i*, and the protrusion 144 has a sloping surface 144*s*; as shown in FIG. 5, after the upper cover 14 is assembled on the lower plate 12, the inner upper sloping surface 122*i* is adjacent to the sloping surface 144*s*, even the inner upper sloping surface 122*i* and the sloping surface 144*s* are in contact with each other. In some embodiments, the inner upper sloping surface 122*i* and the sloping surface 144*s*** are complementary to each other.

Figure 6:
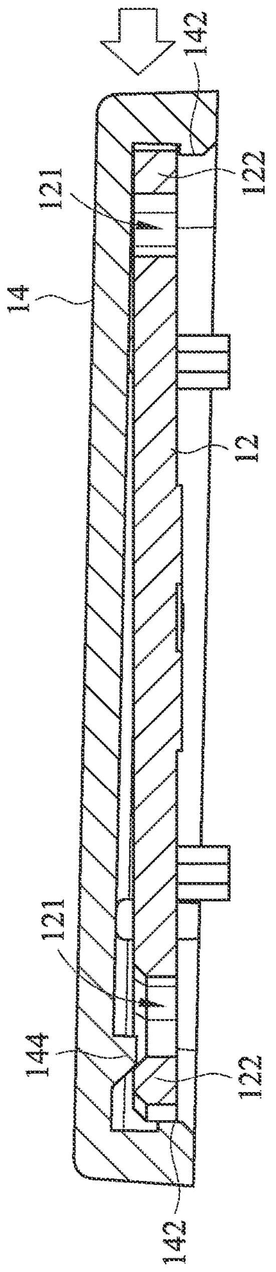
FIG. 6 is a schematic cross-sectional view when the upper cover of FIG. 5 leaves the lower plate.
Figure 7:
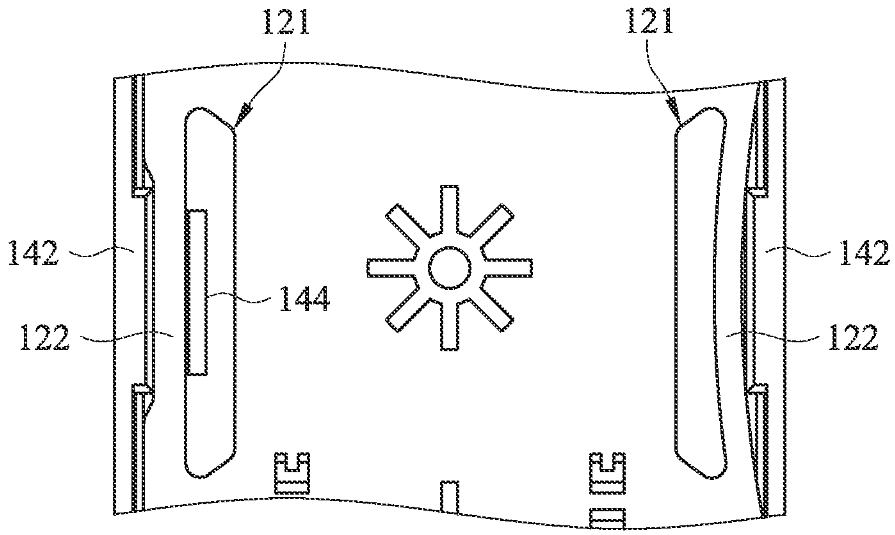
FIG. 7 is a schematic bottom view of parts of the upper cover and the lower plate in FIG. 6.

FIG. 6 is a schematic cross-sectional view when the upper cover of FIG. 5 leaves the lower plate. FIG. 7 is a schematic bottom view of parts of the upper cover and the lower plate in FIG. 6. The disassembly method of the upper cover 14 is described below. Please refer to FIG. 5 and FIGS. 6 and 7, the user can push the upper cover 14 from right to left, and at this time, the right abutting portion 142 pushes the right elastic arm 122, so that the right elastic arm 122 moves slightly to the left, further, the protrusion 144 moves to the upper left along the inner upper sloping surface **122*i* of the left elastic arm 122, and the left abutting portion 142 leaves a lower surface of the portion of the left elastic arm 122. As such, the user can subsequently move the upper cover 14 upwards, and the entire upper cover 14 can leave the lower plate 12**.

However, the present invention is not limited to the above-mentioned embodiments. In other embodiments (not shown), the upper cover has another protrusion corresponding to the other of the two openings (e.g., the right opening 121 shown in FIG. 5) of the lower plate, or the upper cover only has the other protrusion. These upper covers can also leave the lower plate through the above-mentioned method.

However, the above are only the preferred embodiments of the present disclosure, and should not be used to limit the scope of implementation of the present disclosure, that is, simple equivalent changes and modifications made in accordance with claims and description of the present disclosure are still within the scope of the present disclosure. In addition, any embodiment of the present disclosure or claim does not need to achieve all the objectives or advantages disclosed in the present disclosure. In addition, the abstract and the title are not used to limit the scope of claims of the present disclosure.

What is claimed is:

1. A keycap, comprising:

a lower plate, having two openings respectively through two opposite sides of the lower plate to respectively define two elastic arms; and an upper cover, configured to be detachably assembled on the lower plate, wherein the upper cover has two abutting portions and a protrusion, and the two abutting portions are respectively disposed on two opposite inner sides of the upper cover and the two abutting portions respectively correspond to the two elastic arms such that each of the two abutting portions has a corresponding elastic arm, and each of the two abutting portions is configured to abut against a portion of its corresponding elastic arm, and the protrusion is disposed on an inner top surface of the upper cover and corresponds to one of the two openings, wherein a width of one of the two openings is greater than a width of the protrusion.

2. The keycap of claim 1, wherein the lower plate has four connecting portions disposed on a lower surface of the lower plate, and the four connecting portions are configured to respectively connect four portions of a scissor-type connecting element.

3. The keycap of claim 1, wherein after the upper cover is assembled on the lower plate, an overlapping width between each of the two abutting portions and its corresponding elastic arm is in a range of from about 0.15 mm to about 0.20 mm.

4. The keycap of claim 1, wherein each of the elastic arms has an outer upper sloping surface, and each of the two abutting portions has a lower sloping surface, and the outer upper sloping surface and the lower sloping surface are complementary to each other.

5. The keycap of claim 1, wherein a length of each of the elastic arms is greater than a length of each of the two abutting portions.

6. The keycap of claim 1, wherein a length of one of the two openings is greater than a length of the protrusion.

7. The keycap of claim 1, wherein each of the elastic arms has an inner upper sloping surface, and the protrusion has a sloping surface, and after the upper cover is assembled on the lower plate, the inner upper sloping surface is adjacent to the sloping surface.

8. The keycap of claim 1, wherein the upper cover further has at least two positioning portions respectively disposed on two inner sides of the upper cover other than the two opposite inner sides, and the at least two positioning portions are configured to respectively contact two outer edges of two sides of the lower plate other than the two opposite sides.

9. The keycap of claim 1, wherein four corners of the lower plate are inwardly recessed.

10. The keycap of claim 1, wherein an outer edge of each of the elastic arms is inwardly recessed.

* * * * *